US007289444B2

United States Patent
Ogilvie

(10) Patent No.: US 7,289,444 B2
(45) Date of Patent: Oct. 30, 2007

(54) METHOD FOR PROVIDING BOUNDED LATENCY IN A REAL-TIME DATA PROCESSING SYSTEM

(75) Inventor: Clarence Rosser Ogilvie, Huntington, VT (US)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 10/249,516

(22) Filed: Apr. 16, 2003

(65) Prior Publication Data

US 2004/0208124 A1 Oct. 21, 2004

(51) Int. Cl.
*G06F 11/00* (2006.01)

(52) U.S. Cl. .................. 370/235; 370/412; 370/468

(58) Field of Classification Search ............ 370/466, 370/386, 282, 429, 235, 428, 463, 390, 356, 370/474, 412, 468
See application file for complete search history.

(56) References Cited

U.S. PATENT DOCUMENTS 5,280,477 A * 1/1994 Trapp .................. 370/356

OTHER PUBLICATIONS

Sjlomi, Dolev and Kesselman, Alexander. "Bounded Latency Scheduling Scheme for ATM Cells" Apr. 1999 IEEE. p. 273-277.*

* cited by examiner

*Primary Examiner*—Chau Nguyen
*Assistant Examiner*—Kenneth R Hartmann
(74) *Attorney, Agent, or Firm*—Riyon Harding; Dillon & Yudell LLP

(57) ABSTRACT

A method for providing bounded latency in a real-time data processing system is disclosed. Initially, a batch size is selected. Then, a worst case real time bandwidth (WCRTB) and a bytes-in-batch (BIB) are assigned. Next, a worst case data movement time (WCDMT) is calculated by using the WCRTB and BIB. A processor available cycles per second (PACPS), a processor cycle per sample to execute a function (K), a batch period (P) and a sample period (T) are then assigned. A required function cycles per second (RFCPS) is calculated by using the K and T. Subsequently, a BET is calculated by using the P, RFCPS and PACPS. Finally, BET is maintained to be less than P for ensuring the real-time data processing system to function properly.

10 Claims, 2 Drawing Sheets

METHOD FOR PROVIDING BOUNDED LATENCY IN A REAL-TIME DATA PROCESSING SYSTEM

BACKGROUND OF INVENTION

1. Technical Field

The present invention relates to data processing in general, and in particular, to a method for providing a real-time data processing system. Still more particularly, the present invention relates to a method for providing bounded latency in a real-time data processing system.

2. Description of the Related Art

Real-time applications typically have time constraints associated with the data movement as well as the execution of data within a real-time data processing system. One important time constraint is the overall latency of a real-time data processing system. The overall latency is made up of several components within the real-time data processing system, such as moving data onto the real-time data processing system, executing functions against the data, moving the data out of the real-time data processing system. If a batch execution size of four samples is chosen, with a sample rate of 8K samples/second, and if the latency of moving data into the real-time data processing system, executing, and moving data out of the real-time data processing system are each one batch period (P), then P is 0.5 ms. Thus, the latency of moving data into the real-time data processing system, processing data, and moving data out of the real-time data processing system is 3×P=1.5 ms. With the latency of a local-area network to be around 2.5 ms, the overall latency is 1.5 ms+2.5 ms=4.0 ms. Thus, for a gateway application, the overall latency is approximately 4 ms.

The present disclosure describes a method for providing bounded latency in a real-time data processing system in order to guarantee the real-time data processing system to function properly.

SUMMARY OF INVENTION

In accordance with a preferred embodiment of the present invention, a batch size is initially selected. Then, a worst case real time bandwidth (WCRTB) and a bytes-in-batch (BIB) are assigned. Next, a worst case data movement time (WCDMT) is calculated by using the WCRTB and BIB. A processor available cycles per second (PACPS), a processor cycle per sample to execute a function (K), a batch period (P) and a sample period (T) are then assigned. A required function cycles per second (RFCPS) is calculated by using the K and T. Subsequently, a BET is calculated by using the P, RFCPS and PACPS. Finally, BET is maintained to be less than P for ensuring the real-time data processing system to function properly.

All objects, features, and advantages of the presinvention will become apparent in the following detailed written description.

BRIEF DESCRIPTION OF DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Real-time execution of samples by a process within a signal processing environment has historically been done in sample batches to gain execution efficiency. Since there is a certain amount of overhead associated with an operating system and start up code to simply get a process started, so the more samples that can be executed within each process activation, the more efficient a data processing system is because the start up code is amortized (or used just once) against more samples. The cost of more samples in a batch is latency. The more samples in a given batch, the longer a task is held off before starting on that batch of data, which results in additional latency. In a data processing system that is batching samples, the latency is proportional to the size of the batch.

For example, in a BATCH 4 case, the execution of a batch of four samples is held off so four samples can accumulate before an execution is allowed to start. Such hold off has an associated latency of 4 T. Similarly, in a BATCH 8 case, the execution of a batch is held off for 8 samples and has an associated latency of 8 T.

Another characteristic of batching, assuming the process startup overhead is very small, is the execution time of a process is proportional to the batch size. In other words, if the batch execution time (BET) for 4 samples is E sec, then the BET for eight samples is 2 E seconds.

Figure 1:
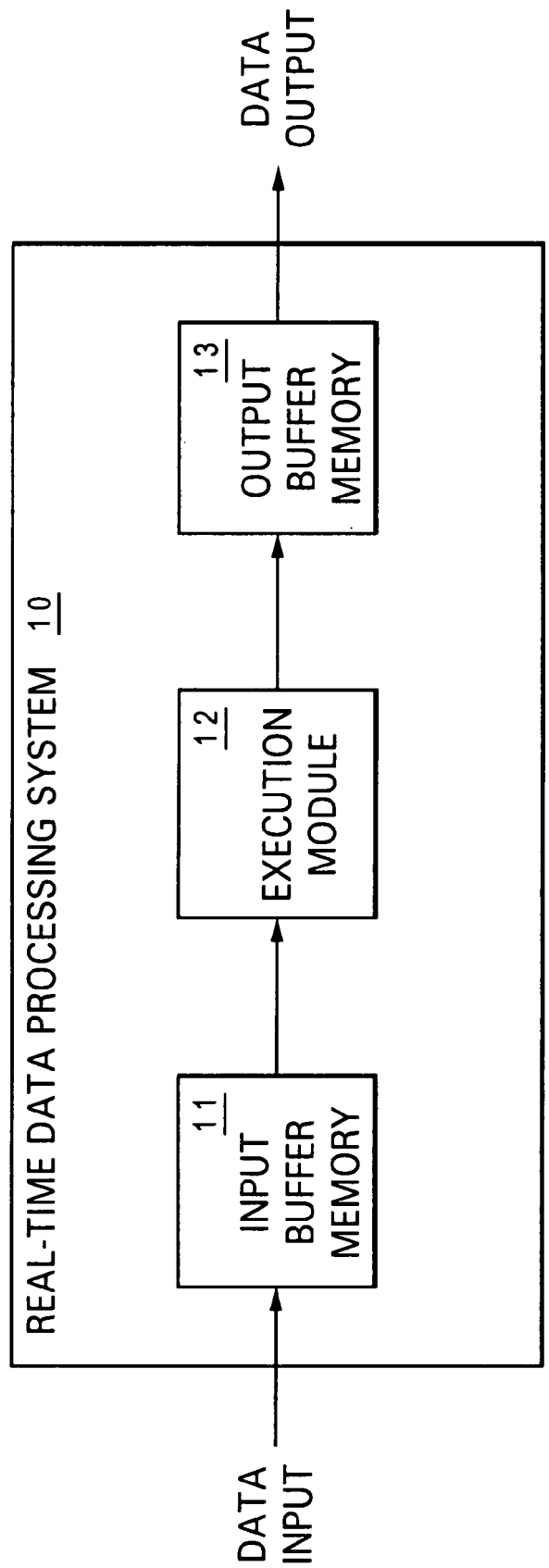
FIG. 1 is a block diagram of a real-time data processing system to which a preferred embodiment of the present invention is applicable.

Referring now to the drawings and in particular to FIG. 1, there is depicted a block diagram of a real-time data processing system to which a preferred embodiment of the present invention is applicable. As shown, a real-time data processing system 10 includes an input buffer memory 11, an execution module 12 and an output buffer memory 13. As mentioned previously, the latency of getting data through a real-time data processing system, such as real-time data processing system 10, includes three different components, namely, moving data into the real-time data processing system, executing code against the incoming data while generating a response to the data, and then moving the data out of the real-time data processing system. An efficient way to maximize throughput (i.e., bandwidth) is to synchronize and pipeline the movement of data with the batch execution of the data within the real-time data processing system. In other words, if the batch execution time for M samples is P ms, then data movement for that execution batch into the real-time data processing system will have happened in the previous P ms and the output response of the execution could be moved off the real-time data processing system in the next P ms.

Moving Data Into the Real-Time Data Processing System

The first latency function is moving data into the real-time data processing system. This involves one or several of the direct memory access (DMA) machines moving all of the data for all channels into the appropriate locations. In most cases, this also includes moving the data into multiple data memories within the real-time data processing system. In the case of one or several synchronous sample interfaces like TDMs or codecs, the batching is synchronized with the synchronous sample interface and the DMA machine. The DMA machine would be programmed to move the data from the synchronous sample interface in batch sizes and to generate a batch clock or signals with which the entire batch system can be synchronized.

The matter of guaranteeing that all of the data be moved in and out of a real-time data processing system within a batch time can be done in the following way. First, given that all real time masters have higher priority on the buses (PLB) than the non-real time masters, a worst case bus analysis can be made. A worst case analysis must consider the latency of getting mastership of the bus and the stalls for each of the masters trying to move data once they have mastership of the bus. Such worst case analysis would show an amount of data moved (B) [in byte] in a worst case amount of time (WCT) [in second], resulting in a worst case real time bandwidth (WCRTB) [in bytes/second] shown in equation (1) as follows:

$$WCRTB=B/WCT \qquad (1)$$

The guaranteed time to complete all of the data movement for a batch is then calculated by dividing the total amount of data in a batch or bytes-in-batch (BIB) [in bytes] by the WCRTBW [in bytes/second]. The worst case data movement time (WCDMT) is shown in equation (2) as follows:

$$WCDMT=BIB/WCRTBW \qquad (2)$$

In order for the real-time data processing system to work at all times, the WCDMT must be less than the batch time P of the real-time data processing system. In a typical real-time data processing system, the WCRTBW is roughly ¼ to ½ of the peek bandwidth. Considering one of the slower buses on a real-time data processing system, the peek bandwidth is 200 Mbytes/sec, so a typical WCRTBW would be 200/4 or 50 Mbytes/second. If a telephony system with 8K samples/sec/channel and 500 channels is considered, the total bandwidth would be 8K×500 or 4 Mbytes/second. If a batch size of four were used, then the batch period P would be 4/8K or 0.5 ms. The BIB would be the total bandwidth of 4 Mbytes/sec*0.0005 second or 2000 bytes. It follows that WCDMT would be 2000 bytes/50 Mbytes/second=0.04 ms. 0.04 ms is much less than 0.5 ms, so the real-time data processing system in this example would work and all data movement deadlines would be met.

Executing Data and the Associated Latency in the Real-Time Data Processing System The second latency function in the real-time data processing system is execution. The function performed here is the execution of some code against a sample stream to perform some real time function or group of functions such as echo cancellation, or forward error correction. The preferred method for executing such samples is batching up incoming samples in a local memory within the real-time data processing system. Once a complete batch of samples is resident in local memory, execute the function against the data can start. The fact that this function is real time and staying within the methods described in the present invention requires that there be a start time and an end time associated with this function as it is executed against a given set of samples (batch) in the sample stream. In order to easily analyze the real time capabilities of the real-time data processing system, a real time task is not allowed to start execution of any sample in a batch of samples until a complete batch has accumulated, and once this batch has accumulated and a start time for execution has been established, the execution must complete within one batch period.

The batch size (number of input and output samples) should not be confused with the number of samples required for a given function. For example, the number of samples in the tail of an echo canceler, and the number of samples in a batch are completely independent. The present invention does not consider phase angle, group phase or latency associated with the function, filter or task being executed on the real-time data processing system. In general, such filter phase angle or task latency must be added to the latency described herein. The latency associated with execution then is just one batch period P, and the only criteria is that the deadline of one batch period P is met to completely execute one batch of samples and create one batch of output samples.

To analyze a simple batch period to see if deadlines can be met the following concepts are useful. Every digital signal processor (DSP) has a certain number of real time cycles/sec (similar to MIPs in a single execution unit machine) that the signal processor is capable of running or processor available cycles per second (PACPS). Also, each task or function requires a number cycles/second to perform a given function or filter or required function cycles per second (RFCPS). If a filter takes K processor cycles per sample (instructions/sample) to execute a function against one sample with an associated sample rate of S samples per second or a period of T (1/S) second/sample, then the required cycles/second to execute such function or filter RFCPS is simply K/T processor cycles per second, as follows:

$$\text{Batch of 1: } RFCPS=K/T \qquad (3)$$

To a first order effect, executing a function against a batch of two samples would take 2K processor cycles and the required time to execute would be 2 T second/sample, resulting in 2K/2 T or K/T cycles/second.

$$\text{Batch of 2: } R\ FCPS=2K/2\ T=K/T \qquad (4)$$

The above-mentioned argument can be extended to any batch of M samples and will result in RFCPS=MK/MT or K/T cycles/second, and thus the cycles/second a task requires is independent of the batch size.

$$\text{Batch of } M{:}R\ FCPS=MK/MT=K/T \qquad (5)$$

The amount of time (without justification) within a batch period P [in second] that a task or function takes to execute is the batch execution time (BET), and this is equal to the batch period P× required function cycles per second (RFCPS)/processor available cycles per second (PACPS).

$$BET=P\times RFCPS/PACPS \qquad (6)$$

It should be mentioned here that deadlines can be met within the real-time data processing system as long as the BET is less than or equal to P. It then follows from Equation (6) that the ratio of RFCPS/PACPS must be less than or equal to 1. This is simply a statement that the total cycles required to execute the function cannot exceed the available cycles of the DSP.

Justification of Equation (6) can be demonstrated with the following argument:

The time to execute a function against single sample using unit analysis is simply a processor cycle per sample to executive a sample K [in cycles/sample]/PACPS [in cycles/second].

$$\text{For one sample/batch: } BET=K/PACPS\times 1 \qquad (7)$$

Thus, BET has units of (second/batch). If the batch size were M samples then the required execution time, or BET in this case, is M times the amount in Equation (7), i.e.:

$$\text{For } M \text{ samples: } BET=K/PACPS\times M \qquad (8)$$

Again, BET is in units of (second/batch). So the proof is in demonstrating that BET from Equation (8) equals the BET from Equation (6), or $$MK/PACPS=P\times RFCPS/PACPS \quad (9)$$

Multiplying both sides by PACPS, $$MK=P\times RFCPS \quad (10)$$

By definition, P=MT, so after substitution, $$MK=MT\times RFCPS \quad (11)$$

as shown in Equation (5), RFCPS=MK/MT, so substituting and multiplying,

MK=MK q.e.d. BET=P×RFCPS/PACPS.

Extending the above arguments to all tasks running within one batch period P, then the BET=P×the sum of all RFCPS/PACPS. As long as the BET for all tasks is less than P, then the execution will complete within the required deadline P, and all function will meet the deadlines. This results in a guaranteed latency for the execution of each task, as well as all tasks to be one batch period P.

Moving Data Off the Real-Time Data Processing System

Asynchronous data movement (in this example, an ethernet LAN) is very much a function of the type of LAN and the loading. If the LAN is a point-to-point, then it can be assumed that the point-to-point part of the LAN is always available to the real-time data processing system to transfer or receive data, however, if the LAN is not point-to-point, then the loading on the LAN must be considered.

For the transmit point-to-point case an amount of data must be transmitted after it is collected. Such data is assembled in a packet and is then transmitted across the LAN. The data is transmitted in ethernet frames.

Overall Latency Analysis for a Specific Batch Size and a LAN

If a real-time signal processing system designer assumes a sampling rate of 5 samples/second and using M samples per batch (ignoring any latency from a non real time interface), then the overall latency has been shown in a synchronous peripheral environment to be 2 P. If the environment requires the data be moved in bursts, then the latency to get the data on a real-time data processing (P), executed (P), and off chip (P), has been shown to be 3 P. In the case of telephony with a sampling rate of 8K samples/second, then the overall latency for the an asynchronous burst environment is 3M/sample rate and assuming M is 4 samples/batch, then the latency is 3×4/8K or 1.5 ms. Next, adding the latency of a point-to-point LAN of 2.51 ms, then the overall latency is 1.5 ms+2.51 ms or 4.01 ms.

Figure 2:
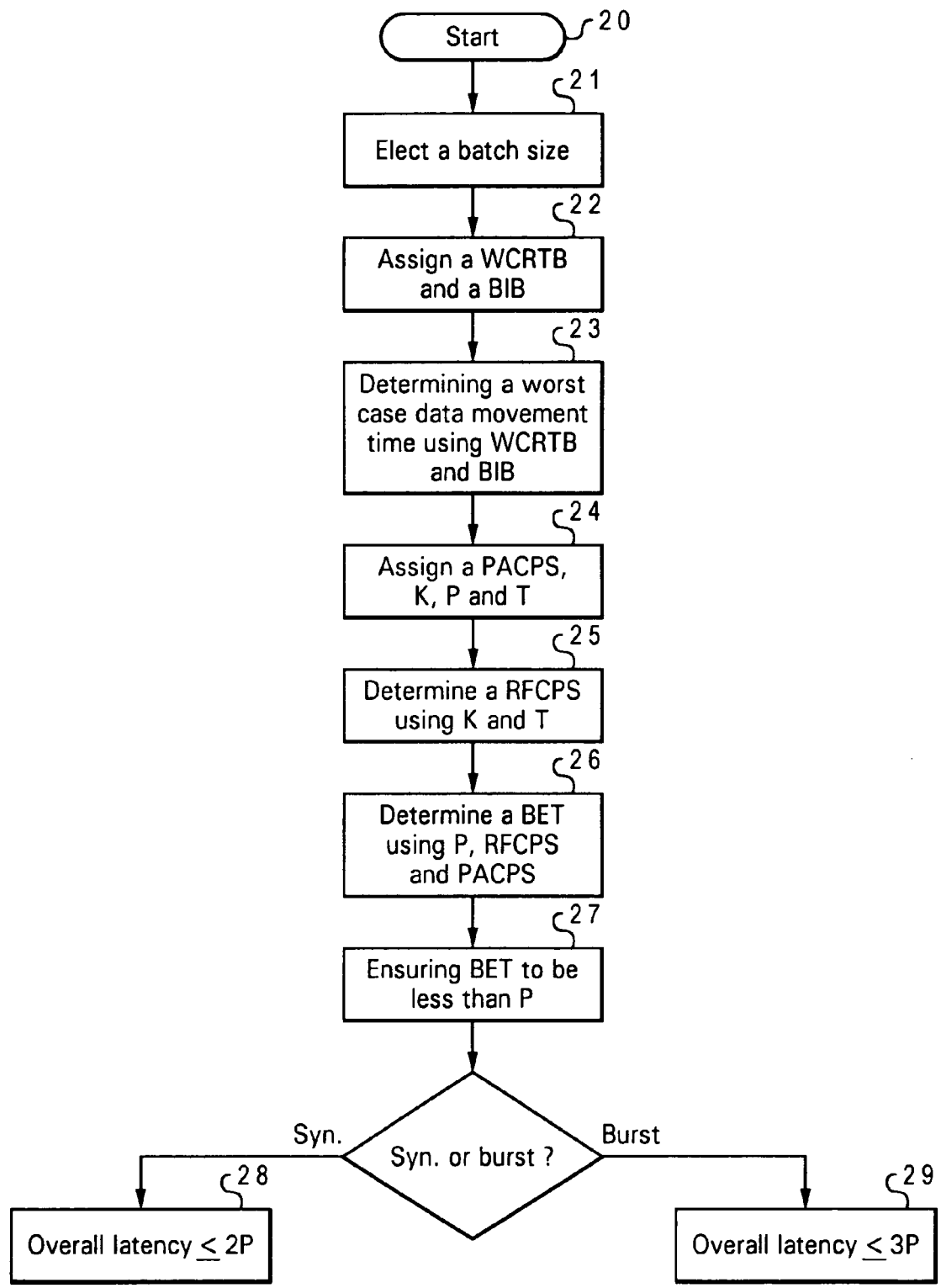
FIG. 2 is a high-level logic flow diagram of a method for providing bounded latency in the real-time data processing system from FIG. 1, in accordance with a preferred embodiment of the present invention.

With reference now to FIG. 2, there is depicted a high-level logic flow diagram of a method for providing bounded latency in the real-time data processing system 10, in accordance with a preferred embodiment of the present invention. Starting at block 20, a batch size M is initially chosen, as shown in block 21. Then, a worst case real time bandwidth WCRTB [in bytes/second] and a bytes-in-batch BIB [in bytes] are assigned, as depicted in block 22. Next, a worst case data movement time WCDMT [in second] is calculated, as shown in block 23, using WCRTB and BIB by $$WCDMT=BIB/WCRTBW$$

Next a processor available cycles per second PACPS, a processor cycle per sample to execute a function K, a batch period P and a sample period T are assigned, as depicted in block 24. Then, a required function of cycles per second RFCPS [in cycles/second] is calculated, as shown in block 25, using K and T by $$RFCPS=K/T$$

Finally, a batch execution time BET is calculated, as depicted in block 26, using P, RFCPS and PACPS by $$BET=P\times RFCPS/PACPS$$

BET is maintained to be less than batch period P, as shown in block 27, for guaranteeing real-time data processing system 10 (from FIG. 1) to function properly.

The overall latency of a synchronous system will be less than or equal to 2 P, as depicted in block 28. The overall latency of a burst system will be less than or equal to 3 P, as depicted in block 29.

As has been described, the present invention provides method for providing bounded latency in the real-time data processing system.

While the invention has been particularly shown and described with reference to a preferred embodiment, it will be understood by those skilled in the art that various changes in form and detail may be made therein without departing from the spirit and scope of the invention.

The invention claimed is:

1. A method for providing bounded latency in a real-time data processing system, said method comprising:
   selecting a batch size (M);
   assigning a worst case real time bandwidth (WCRTB) and a bytes-in-batch (BIB);
   determining a worst case data movement time (WCDMT) using said WCRTB and said BIB;
   assigning a processor available cycles per second (PACPS), a processor cycle per sample to execute a function (K), a batch period (P) and a sample period (T);
   determining a required function cycles per second (RFCPS) using said K and said T;
   determining a batch execution time (BET) using said P, said RFCPS and said PACPS; and
   maintaining BET to be less than P for guaranteeing said real-time data processing system to function properly.

2. The method of claim 1, wherein said determining a WCDMT further includes determining a WCDMT by $$WCDMT=BIB/WCRTBW.$$

3. The method of claim 1, wherein said determining a RFCPS further includes determining a RFCPS by $$RFCPS=K/T.$$

4. The method of claim 1, wherein said determining a BET further includes determining a BET by $$BET=P\times RFCPS/PACPS.$$

5. The method of claim 1, wherein said WCRTB is in bytes/second.

6. A computer storage medium having a computer program product for providing bounded latency in a real-time data processing system, said computer storage medium comprising:

program code means for selecting a batch size (M);

program code means for assigning a worst case real time bandwidth (WCRTB) and a bytes batch (BIB);

program code means for determining a worst case data movement time (WCDMT) using said WCRTB and said BIB;

program code means for assigning a processor available cycles per second (PACPS), a processor cycle per sample to execute a function (K), a batch period (P) and a sample period (T);

program code means for determining a required function cycles per second (RFCPS) using said K and said T;

program code means for determining a batch execution time (BET) using said P, said RFCPS and said PACPS; and program code means for maintaining BET to be less than P for guaranteeing said real-time data processing system to function properly.

7. The computer storage medium of claim 6, wherein said program code means for determining a WCDMT further includes program code means for determining a WCDMT by $$WCDMT = BIB/WCRTBW.$$

8. The computer storage medium of claim 6, wherein said program code means for determining a RFCPS further includes program code means for determining a RFCPS by $$RFCPS = K/T.$$

9. The computer storage medium of claim 6, wherein said program code means for determining a BET further includes program code means for determining a BET by $$BET = P \times RFCPS/PACPS.$$

10. The computer storage medium of claim 6, wherein said WCRTB is in bytes/second.

* * * * *